(12) United States Patent
Lee et al.

(10) Patent No.: US 9,079,474 B2
(45) Date of Patent: Jul. 14, 2015

(54) COUPLED TORSION BEAM AXLE TYPE SUSPENSION SYSTEM

(71) Applicant: Hyundai Motor Company, Seoul (KR)

(72) Inventors: Jaekil Lee, Suwon (KR); Seon Pyung Kim, Seoul (KR); Youn Hyung Cho, Seoul (KR); Jin-Ho Jung, Hwaseong (KR); Seong Hee Jeong, Seoul (KR)

( * ) Notice: Subject to any disclaimer, the term of this patent is extended or adjusted under 35 U.S.C. 154(b) by 0 days.

(21) Appl. No.: 14/486,429

(22) Filed: Sep. 15, 2014

(65) Prior Publication Data

US 2015/0123372 A1    May 7, 2015

(30) Foreign Application Priority Data

Nov. 4, 2013    (KR) ........................ 10-2013-0132955

(51) Int. Cl.
*B60G 21/05*    (2006.01)
*B60G 7/00*    (2006.01)
*B60G 7/02*    (2006.01)

(52) U.S. Cl.
CPC ................ *B60G 21/052* (2013.01); *B60G 7/00* (2013.01); *B60G 7/02* (2013.01)

(58) Field of Classification Search
CPC ........... B60G 21/052; B60G 7/02; B60G 7/00
USPC ................................................ 280/124.128
See application file for complete search history.

(56) References Cited

U.S. PATENT DOCUMENTS

| 4,429,900 A * | 2/1984 | Feher ...................... 280/124.128 |
| 6,250,660 B1 * | 6/2001 | Woo ........................ 280/124.149 |
| 2008/0290623 A1 * | 11/2008 | Lundmark ............. 280/124.152 |

FOREIGN PATENT DOCUMENTS

| DE | 102012000425 A1 * | 7/2013 | ............. B60G 21/05 |
| JP | 2006-335118 A | 12/2006 | |
| JP | 2013-052855 A | 3/2013 | |
| KP | 10-2013-0125062 A | 11/2013 | |
| KR | 10-0882667 B1 | 2/2009 | |

\* cited by examiner

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

Disclosed is a coupled torsion beam axle type suspension system. In particular, the coupled torsion beam axle type suspension system includes trailing arms respectively coupled to opposite ends of a torsion beam and a vehicle body-engaging unit provided in a front end portion of each of the trailing arm and engaging the trailing arm to a vehicle body. Each vehicle body-engaging unit includes a trailing arm bushing that is coupled to a front end portion of the trailing arm, a rotation link disposed in front of the trailing arm bushing and engaged thereto in a width direction of a vehicle, and a pair of connection links configured to respectively couple front and outer end portions thereof to the vehicle body, such that an instantaneous rotational center point of the rotation link is formed outside of the rotation link in the width direction of the vehicle.

11 Claims, 9 Drawing Sheets

COUPLED TORSION BEAM AXLE TYPE SUSPENSION SYSTEM

CROSS-REFERENCE TO RELATED APPLICATION

This application claims priority to and the benefit of Korean Patent Application No. 10-2013-0132955 filed in the Korean Intellectual Property Office on Nov. 4, 2013, the entire contents of which are incorporated herein by reference.

BACKGROUND OF THE INVENTION (a) Field of the Invention

The present invention relates to a coupled torsion beam axle type suspension system, and more particularly, to a coupled torsion beam axle type suspension system that improves single impact characteristics of an outer rear wheel with respect to thrust and drag forces as well as controlling movement (i.e., toe) characteristics thereof with respect to a side force, when a vehicle turns.

(b) Description of the Related Art

Generally, despite limitations in design performance factors such as ride comfort, driving stability, etc., a coupled torsion beam axle type suspension system (hereinafter referred to as a CTBA) has been primarily applied to rear wheel suspension systems for compact and mid-size cars. These CTBA systems are used instead of independent-type suspension systems, because they are advantageously light weight and low cost to make due to their simplified components.

FIG. 1 is a perspective view of a CTBA according to one example of the related art. Referring to FIG. 1, the exemplary CTBA according to the related art is provided with a torsion beam 1 in a width direction of a vehicle, trailing arms 5 respectively coupled to opposite ends of the torsion beam 1, and carriers 3 for mounting wheel tires at the trailing arms 5. A spring seat 9 for mounting a spring 7 thereon and a shock absorber pin 13 for coupling with a shock absorber 11 are also provided at a rear inner portion of the trailing arm 5. In addition, a vehicle body-engaging unit 15 is provided at a front end portion of the trailing arm 5 to be coupled to a vehicle body.

More specifically, each vehicle body-engaging unit 15 includes a trailing arm bushing 21 that is coupled to the front end portion of the trailing arm 5, and a mounting bracket 23 that is coupled to the trailing arm bushing 21 through a bolt 25.

CTBAs that have the aforementioned configuration, often result in wheel deformation due to the twisting deformation characteristics of the torsion beam 1. The positions of the trailing arm 5 and the configuration of the vehicle body-engaging unit 15 may also cause deformation of the wheels.

Vehicles should maintain a certain level of under-steering tendency to stabilize the vehicle during turns. For this purpose, ideally a rear outer wheel of the vehicle while making a turn (hereinafter referred to as a rear outer wheel) should be induced to toe-in and a rear inner wheel of the vehicle while making a turn (hereinafter referred to as a rear inner wheel) should be induced to toe-out.

However, this type of conventional CTBA has certain problems in performing this movement. For example, FIG. 2 is a top plan view illustrating movement characteristics of the coupled torsion beam axle type suspension system, applied with a side force, according to one example of the related art.

As shown in FIG. 2, though the CTBA according to one example of the related art is not mechanically moveable when applied with a side force F1, the entire CTBA rotates due to the deformation of the trailing arm bushing 21 and generates a toe angle at the rear outer wheel W1.

That is, when the vehicle makes a turn, the rear outer wheel W1 is applied with the side force F1 and thus is likely to be induced to toe-out, while the rebounded rear inner wheel W2 is applied with the side force F1 and thus is likely to maintain the previous toe angle or to be induced to toe-in. This results in the vehicle being over-steered in general, thus reducing the stability of the vehicle.

As a mechanical instantaneous rotational center point SP of the CTBA with respect to the vehicle body (i.e., an intersection of lines that extend in engaging directions of the trailing arm bushings 21 engaged to the vehicle body) is positioned in front of the wheel centers WC, the rear outer wheel W1 has a tendency to toe-out due to the side force F1 while the rear inner wheel W2 has a tendency to toe-in due to the side force F1.

In order to solve such a turning stability problem in the conventional CTBA, suspension systems are currently being developed to improve a structure of the vehicle body and the vehicle body-engaging unit of the trailing arm 5 so that the instantaneous rotational center point SP of the CTBA with respect to the vehicle body is positioned behind the wheel centers WC.

FIG. 3 is a top plan view of a coupled torsion beam axle type suspension system according to another example of the related art. Referring to FIG. 3 the improved CTBA according to the another example is provided with a rotation link 31 as a vehicle body-engaging unit 15 between a vehicle body and a trailing arm bushing 21, such that an instantaneous rotational center point SP with respect to the vehicle body is positioned behind wheel centers WC.

That is, a rear end portion of the rotation link 31 is engaged in parallel to the trailing arm bushing 21 in a width direction of the vehicle, and a front end portion thereof is provided with a vehicle body-mounting bushing 33 that is moveable with respect to the vehicle body in a rotational direction, thereby being engaged to one lower portion of the vehicle body.

In this case, the vehicle body-mounting bushing 33 is coupled to the trailing arm bushing 21 through the rotation link 31 and is engaged to the vehicle body in the height direction of the vehicle, such that it is engaged to the vehicle body at an outer front of the rotation link in the width direction of the vehicle. Thus, the instantaneous rotational center point SP of the CTBA with respect to the vehicle body is formed at an intersection of the extending lines that connect centers S1 of the mounting bushings 33 with centers S2 of the trailing arm bushings 21, and is positioned behind the wheel centers WC.

As such, in this CTBA, the instantaneous rotational center point SP with respect to the vehicle body is positioned behind the wheel centers WC, so that it has certain movement characteristics with respect to the side force F1 and the thrust and drag forces that are described below with reference to FIGS. 4A-C.

FIGS. 4A-C are top plan views illustrating movement characteristics of the coupled torsion beam axle type suspension system, applied with the side force and the thrust and drag forces, according to another example of the related art. In FIG. 4A, when rear wheels are applied with the side force F1, the rear outer wheel is induced to toe-in while the rebounded rear outer turning wheel W2 maintains a set toe-in angle or is induced to toe-out, such that the vehicle is generally under-steered to secure the turning stability. Meanwhile, the CTBA is induced to rotate based on the instantaneous rotational center point SP when the rear wheels are applied with the thrust and drag forces F2 as well as the side force F1.

That is, in FIG. 4 B, in the CTBA according to another example, in a double impact environment in which the rear wheels are simultaneously applied with thrust and drag forces, such as when the vehicle brakes or passes over a speed bump, rotation of the CTBA is offset by symmetrical rotation of the rear wheels, thereby guaranteeing the driving stability.

However, in FIG. 4 C, in a single impact environment in which one of the rear wheels is asymmetrically applied with thrust and drag forces F2, the corresponding rear wheel is induced to toe-out which makes the movement characteristics of the CTBA unstable in general, thereby deteriorating the driving stability as in the previous example according to the related art.

The above information disclosed in this Background section is only for enhancement of understanding of the background of the invention and therefore it may contain information that does not form the related art that is already known in this country to a person of ordinary skill in the art.

SUMMARY OF THE INVENTION

A coupled torsion beam axle type suspension system according to an exemplary embodiment of the present invention may include: trailing arms respectively coupled to opposite ends of a torsion beam; and a vehicle body-engaging unit provided in a front end portion of each of the trailing arm and engaging the trailing arm to a vehicle body. Each vehicle body-engaging unit may include a trailing arm bushing that is coupled to a front end portion of the trailing arm; a rotation link disposed in front of the trailing arm bushing and engaged thereto in a width direction of a vehicle; and a pair of connection links configured to respectively couple front and outer end portions thereof to the vehicle body, such that an instantaneous rotational center point of the rotation link is formed outside of the rotation link in the width direction of the vehicle.

An intersection of extending lines that pass through the instantaneous rotational center points of the rotation links and centers of the trailing arm bushings may form an instantaneous rotational center point of the CTBA, and the instantaneous rotational center point of the CTBA may be positioned behind wheel centers. The instantaneous rotational center point of the rotation link may be formed at an intersection of extending lines of the connection links in length directions thereof.

Each connection link may include a front connection link that is disposed between the front end portion of the rotation link and the vehicle body in the width direction of the vehicle, opposite ends of which are coupled therebetween, and a rear connection link that is disposed between the outer end portion of the rotation link and the vehicle body, opposite ends of which are coupled therebetween. In particular, in some exemplary embodiments of the present invention, the rear connection link may be shorter in length than the front connection link.

Furthermore, the front and rear connection links may be coupled through mounting bearings to be rotatable with respect to the rotation links and are connected to the vehicle body through mounting bushings.

A coupled torsion beam axle type suspension system, in which opposite ends of a torsion beam are coupled to trailing arms and left and right trailing arms are coupled to vehicle body-engaging units for being mounted on the vehicle body at their front end portions. Each vehicle body-engaging unit includes: a trailing arm bushing connected to the front end portion of the trailing arm; a rotation link disposed in front of the trailing arm bushing and engaged to the trailing arm bushing in a width direction of the vehicle; and a pair of connection links configured to respectively couple front and outer end portions of the rotation link to the vehicle body and to form an instantaneous rotational center point of the rotation link outside of the rotation link in the width direction of the vehicle, and wherein the instantaneous rotational center point SP of the CTBA may be configured to be formed behind wheel centers by an intersection of extending lines that pass through the instantaneous rotational center points of rotation links and centers of the trailing arm bushings.

Each connection link may include a front connection link that is disposed between the front end portion of the rotation link and the vehicle body in the width direction of the vehicle, opposite ends of which are coupled therebetween, and a rear connection link that is disposed between the outer end portion of the rotation link and the vehicle body, opposite ends of which are coupled therebetween. Again, the rear connection link may be shorter in length than the front connection link.

The front and rear connection links may be coupled through mounting bearings and through mounting bushings to the vehicle body such that they are rotatable with respect to the rotation links. Additionally, the instantaneous rotational center point of the rotation link may be formed at an intersection of extending lines of the two connection links in length directions thereof.

The exemplary embodiment of the present invention may allow the instantaneous rotational center point SP of the CTBA to be positioned behind wheel centers by coupling the rotation link coupled to the trailing arm bushing to the vehicle body through the two connection links, such that the outer rear wheel is induced to toe-in and the inner rear wheel is induced to toe-out so as to cause the vehicle to be understeered, thereby securing the turning stability thereof.

In addition, in a single impact situation when one of the rear-wheels is asymmetrically applied with the thrust and drag forces, such as when driving on a rough road, the instantaneous rotational center point CP of the rotation link with respect to the vehicle body varies and thus the instantaneous rotational center point of the CTBA is moved outside of a line of action where the thrust and drag forces are applied, thereby decreasing the amount of toe-out. That is, the amount of rotation of the corresponding rear wheel in a toe-out direction is decreased to secure the overall driving stability of the CTBA.

DESCRIPTION OF SYMBOLS

Figure 1:
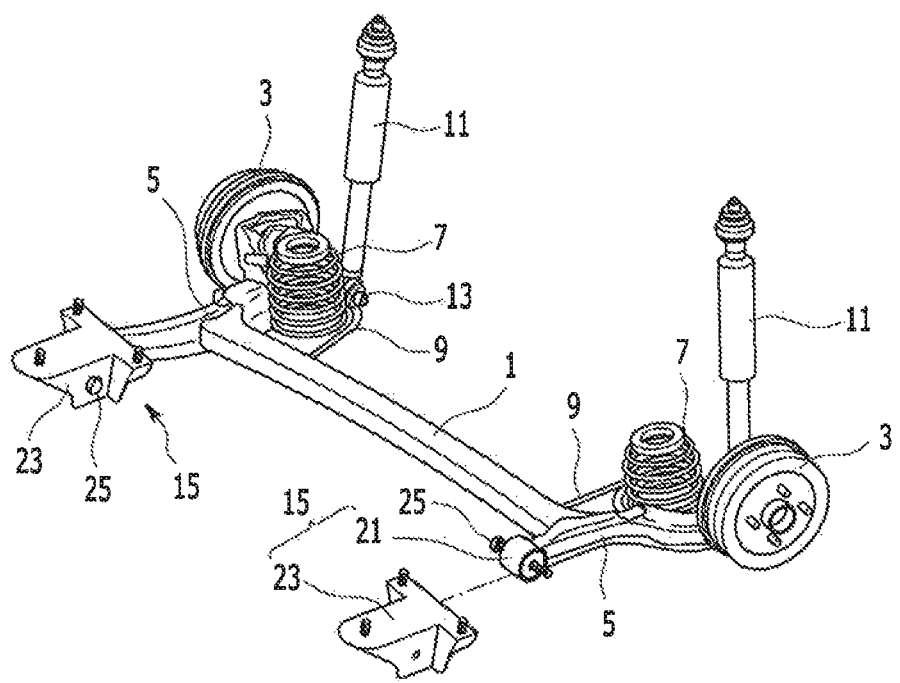
FIG. 1 is a perspective view of a coupled torsion beam axle type suspension system according to one example of the related art.
Figure 2:
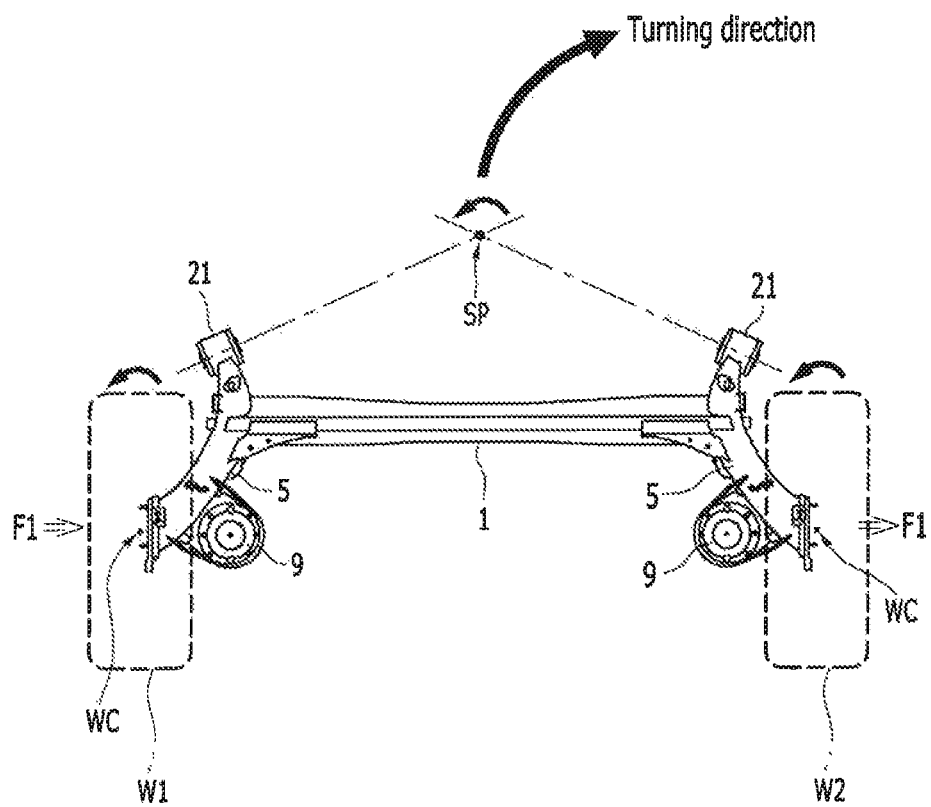
FIG. 2 is a top plan view illustrating movement characteristics of the coupled torsion beam axle type suspension system, applied with a side force, according to one example of the related art.
Figure 3:
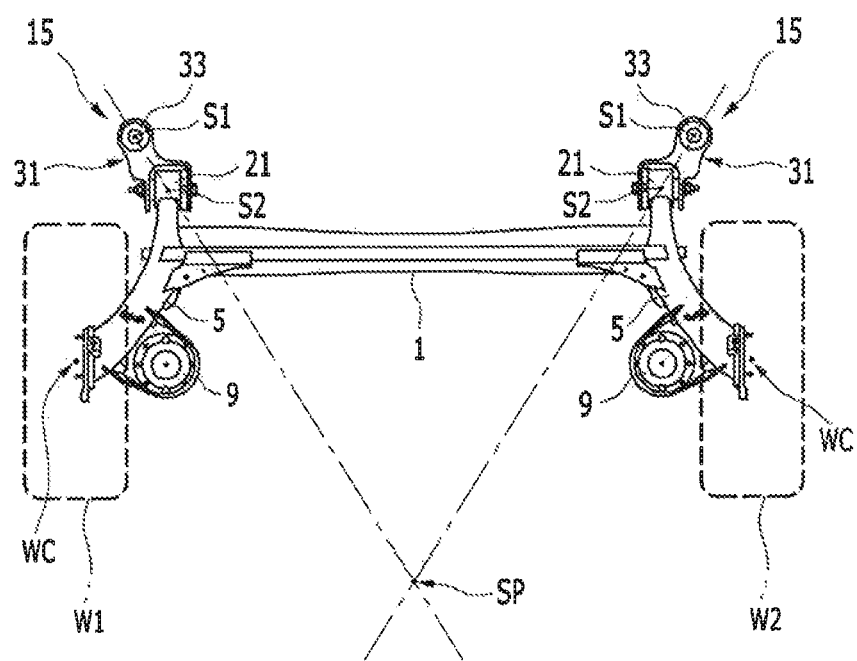
FIG. 3 is a top plan view of a coupled torsion beam axle type suspension system according to another example of the related art.
Figure 4A:
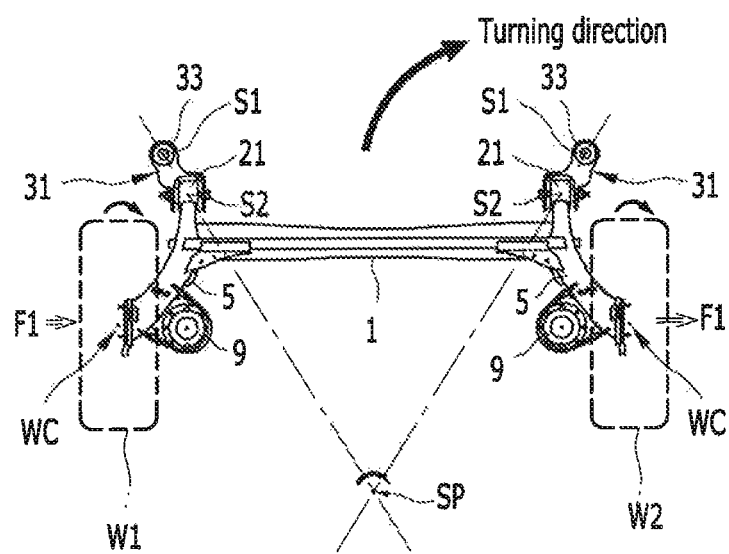
FIG. 4 A-C are top plan views illustrating movement characteristics of the coupled torsion beam axle type suspension system, applied with the side force and thrust and drag forces, according to another example of the related art.
Figure 4B:
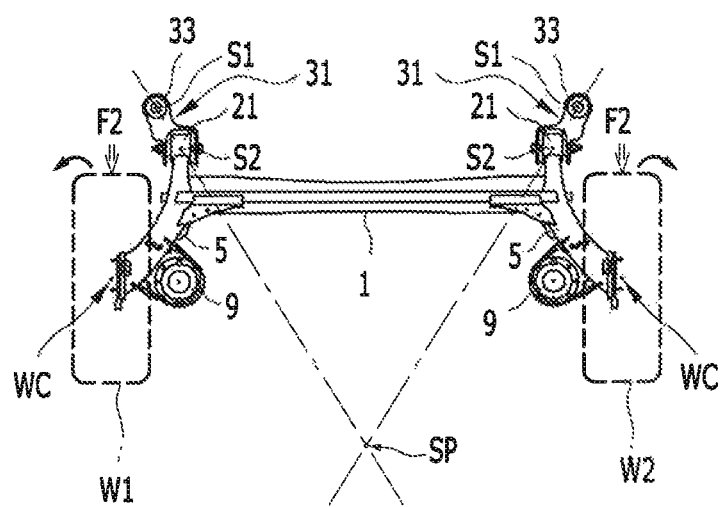
Figure 4C:
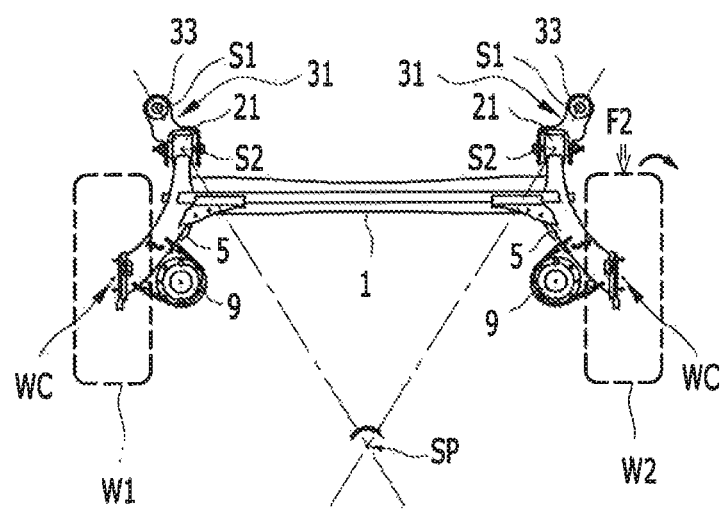

1: torsion beam
3: carrier
5: trailing arm
9: spring seat
15: vehicle body-engaging unit
21: trailing arm bushing
31: rotation link
33: vehicle body-mounting bushing
R1: front connection link
R2: rear connection link
M: mounting bushing
B: mounting bearing
CP: instantaneous rotational center point of rotation link
SP: instantaneous rotational center point of CTBA
50: vehicle body

DETAILED DESCRIPTION OF THE EMBODIMENTS

Hereinafter, an exemplary embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the exemplary embodiments of the present invention, and like reference numerals designate like elements throughout the specification, which also applies to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Figure 5:
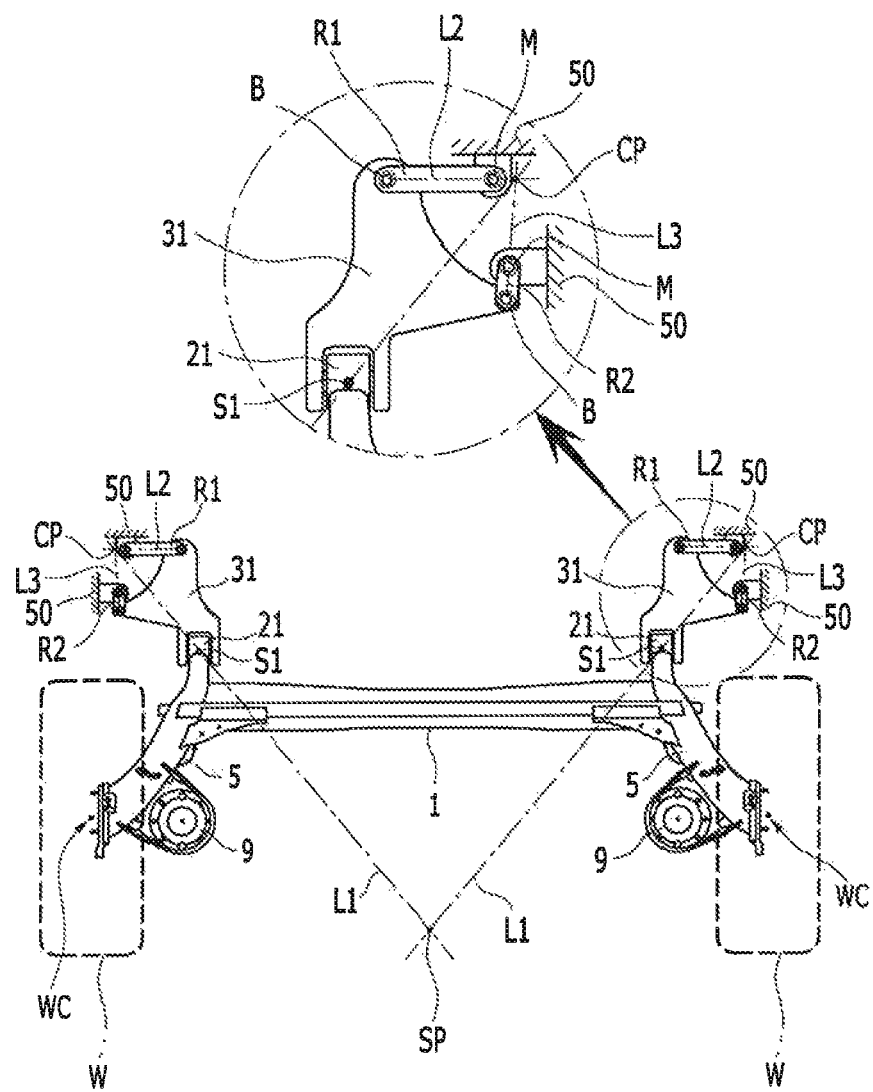
FIG. 5 is a top plan view of a coupled torsion beam axle type suspension system according to an exemplary embodiment of the present invention.

Further, when describing an exemplary embodiment of the present invention, for ease of description, it is assumed that an upper portion of FIG. 5 is defined as a front direction and a lower portion is defined as a rear direction. A coupled torsion beam axle type suspension system according to an exemplary embodiment of the present invention is symmetrically provided in each rear wheel of a vehicle, and for ease of description, a description of one side will be applicable to the other side.

Figure 6:
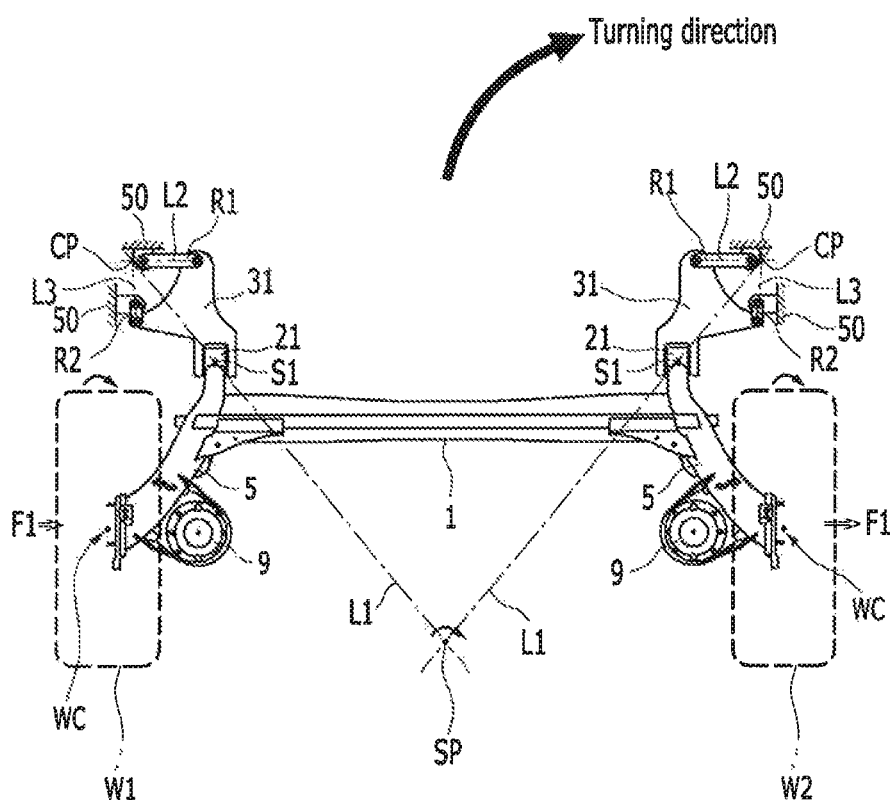
FIG. 6 is a top plan view illustrating movement characteristics of the coupled torsion beam axle type suspension system, applied with the side force according to the exemplary embodiment of the present invention.
Figure 7:
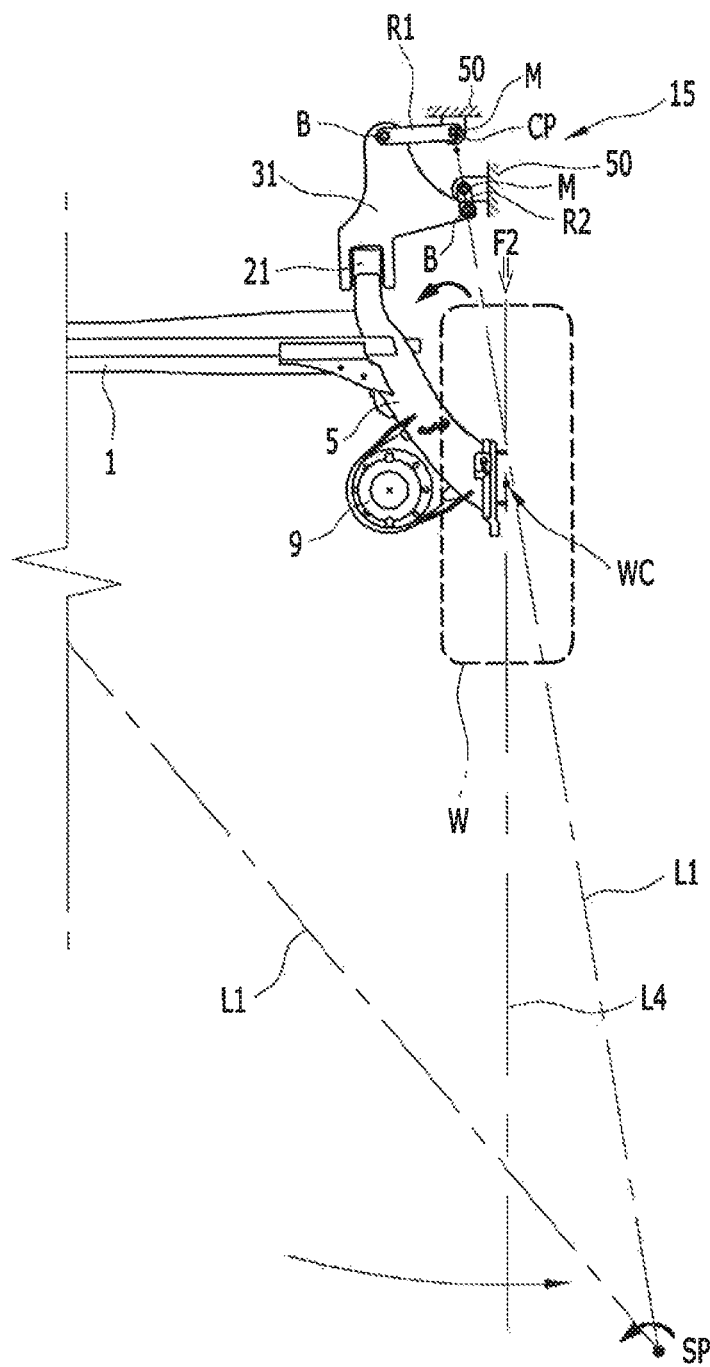
FIG. 7 is a top plan view illustrating movement characteristics of the coupled torsion beam axle type suspension system, applied with the thrust and drag forces according to the exemplary embodiment of the present invention.

FIG. 5 is a top plan view of a coupled torsion beam axle type suspension system according to an exemplary embodiment of the present invention, FIG. 6 is a top plan view illustrating movement characteristics of the coupled torsion beam axle type suspension system, applied with a side force according to the exemplary embodiment of the present invention, and FIG. 7 is a top plan view illustrating movement characteristics of the coupled torsion beam axle type suspension system, applied with thrust and drag forces according to the exemplary embodiment of the present invention.

Referring to FIG. 5, a coupled torsion beam axle type suspension system (hereinafter referred to as a CTBA) is provided with a torsion beam 1 in a width direction of a vehicle, and trailing arms 5 respectively fixed to opposite ends of the torsion beam 1. A vehicle body-engaging unit 15 is provided at a front end portion of the trailing arms 5 to be coupled to a vehicle body 50.

In the CTBA according to the exemplary embodiment of the present invention, each vehicle body-engaging unit 15 includes a trailing arm bushing 21, a rotation link 31, and front and rear connection links R1 and R2. The trailing arm bushing 21 is coupled to the front end portion of the trailing arm 5. The rotation link 31 is disposed in front of the trailing arm bushing 21, and is engaged in parallel with the trailing arm bushing 21 in the width direction of the vehicle.

Further, the front connection link R1 may be disposed between the front end portion of the rotation link 31 and the vehicle body 50 in the width direction of the vehicle, so that its opposite ends are respectively coupled to the front end portion of the rotation link 31 and the vehicle body 50.

In addition, the rear connection link R2 may be disposed between an outer end portion of the rotation link 31 and the vehicle body 50 such that its opposite ends are respectively coupled to the outer end portion of the rotation link 31 and the vehicle body 50. In this case, the rear connection link R2 is relatively shorter in length than the connection link R1 such that an amount of movement of the outer end portion of the rotation link 31 is relatively small.

In the exemplary embodiments, the front and rear connection links R1 and R2 are coupled through mounting bearings B such that they are rotatable with respect to the rotation link 31, and are coupled to the vehicle body 50 through mounting bushings M.

Referring to FIG. 6, the front and rear connection links R1 and R2 respectively couple the front and outer end portions of the rotation link 31 to the vehicle body 50, such that an instantaneous rotational center point CP is formed outside of the rotation link 31 in the width direction of the vehicle. That is, the instantaneous rotational center point CP is formed at an intersection where extending lines L2 and L3 of the front and rear connection links R1 and R2 meet in their length directions.

Further, in the exemplary embodiment of the present invention, an instantaneous rotational center point SP is formed at the intersection of extending lines L1 that pass through the instantaneous rotational center points CP of the rotation links 31 and centers S1 of the trailing arm bushings 21. In this case, the instantaneous rotational center point SP of the CTBA is set such that it is positioned behind the wheel centers WC.

Accordingly, in the CTBA according to the exemplary embodiment of the present invention, as shown in FIG. 6, the instantaneous rotational center point SP of the CTBA with respect to the vehicle body, which is formed by the intersection of the extending lines L1 that pass through the instantaneous rotational center points CP of the rotation links 31 and the centers S1 of the trailing arm bushings 21, is formed behind the wheel centers WC.

Accordingly, in the CTBA according to the exemplary embodiment of the present invention, the rotation links 31 form a four-node link apparatus between the trailing arms 5 and the vehicle body, in which the instantaneous rotational center points CP due to the two connection links R1 and R2 and the centers S1 of the trailing arm bushings 21 are used as pivot points.

Thus, referring to FIG. 6, in the CTBA, when the rear wheels are applied with the side force F1, such as when the vehicle is turning, the outer rear wheel W1 rotated and pushed based on the instantaneous rotational center point SP is induced to toe-in and thus the vehicle is under-steered in general, thereby securing the turning stability.

Further, referring to FIG. 7, in a single impact situation when one of the rear-wheels W is asymmetrically applied with a thrust and drag forces F2, such as when the vehicle is driven on a rough road, the rotation link 31 instantaneously rotates counter-clockwise when the CTBA is applied with the thrust and drag forces F2. That is, the instantaneous rotational center point CP of the rotation link 31 with respect to the vehicle body is moved inside thereof due to a movement mechanism of the rotation link, and accordingly, the instantaneous rotational center point SP is moved even closer to the wheels, which are applied with the thrust and drag forces F2, thereby decreasing the amount at which the wheel is toed-out.

That is, the CTBA according to the exemplary embodiment of the present invention does not use physical joints, such as conventional bearings, as the pivots between the rotation links 31 and the vehicle body, but instead uses the mounting bushings M to change the instantaneous center of the mechanism and thus provide greater stability during single impact situations.

Accordingly, the instantaneous rotational center between the CTBA and the vehicle body is moved outside of a line of action L4 and thus reverses a rotational direction with respect to the thrust and drag forces F. As a result, the amount of rotation is decreased in the toe-out direction to secure the overall driving stability of vehicle with the CTBA installed therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A coupled torsion beam axle type suspension system (CTBA), comprising:
   trailing arms each respectively coupled to opposite ends of a torsion beam; and
   vehicle body-engaging units, each provided in a front end portion of each of the trailing arms and engaging each of the trailing arms to a vehicle body, wherein
   each vehicle body-engaging unit includes:
   a trailing arm bushing that is coupled to a front end portion of the trailing arm;
   a rotation link disposed in front of the trailing arm bushing and engaged thereto in a width direction of a vehicle; and
   a pair of connection links configured to respectively couple front and outer end portions thereof to the vehicle body, such that, wherein an instantaneous rotational center point of the rotation link is formed outside of the rotation link in the width direction of the vehicle.

2. The system of claim 1, wherein an intersection of extending lines that pass through the instantaneous rotational center points of the rotation links and centers of the trailing arm bushings forms an instantaneous rotational center point of the CTBA, and the instantaneous rotational center point of the CTBA is positioned behind wheel centers.

3. The system of claim 1, wherein each connection link includes a front connection link that is disposed between the front end portion of the rotation link and the vehicle body in the width direction of the vehicle, opposite ends of which are coupled therebetween, and a rear connection link that is disposed between the outer end portion of the rotation link and the vehicle body, opposite ends of which are coupled therebetween.

4. The system of claim 3, wherein the rear connection link is shorter in length than the front connection link.

5. The system of claim 4, wherein the instantaneous rotational center point of the rotation link is formed at an intersection of extending lines of the connection links in length directions thereof.

6. The system of claim 3, wherein the front and rear connection links are coupled through mounting bearings to be rotatable with respect to the rotation links and are connected to the vehicle body through mounting bushings.

7. A vehicle body engaging unit for a torsion beam axle type suspension system of a vehicle to be mounted on a vehicle body, the, vehicle body-engaging unit comprising:
   a trailing arm bushing connected to a front end portion of a trailing arm;
   a rotation link disposed in front of the trailing arm bushing and engaged to the trailing arm bushing in a width direction of the vehicle; and
   a pair of connection links configured to respectively couple front and outer end portions of the rotation link to the vehicle body and to form an instantaneous rotational center point of the rotation link outside of the rotation link in the width direction of the vehicle,
   wherein the instantaneous rotational center point of a coupled torsion beam axle type suspension system (CTBA) is configured to be formed behind wheel centers by an intersection of extending lines that pass through the instantaneous rotational center points of rotation link and center of the trailing arm bushing.

8. The system of claim 7, wherein each connection link includes a front connection link that is disposed between the front end portion of the rotation link and the vehicle body in the width direction of the vehicle, opposite ends of which are coupled therebetween, and a rear connection link that is disposed between the outer end portion of the rotation link and the vehicle body, opposite ends of which are coupled therebetween.

9. The system of claim 8, wherein the rear connection link is shorter in length than the front connection link.

10. The system of claim 8, wherein the front and rear connection links are coupled through mounting bearings and through mounting bushings to the vehicle body such that they are rotatable with respect to the rotation link.

11. The system of claim 7, wherein the instantaneous rotational center point of the rotation link is formed at the intersection of the extending lines of the pair connection links in length directions thereof.

* * * * *